No. 649,257. Patented May 8, 1900.
O. D. PARK.
SEED PLANTER.
(Application filed Feb. 21, 1900.)
(No Model.)
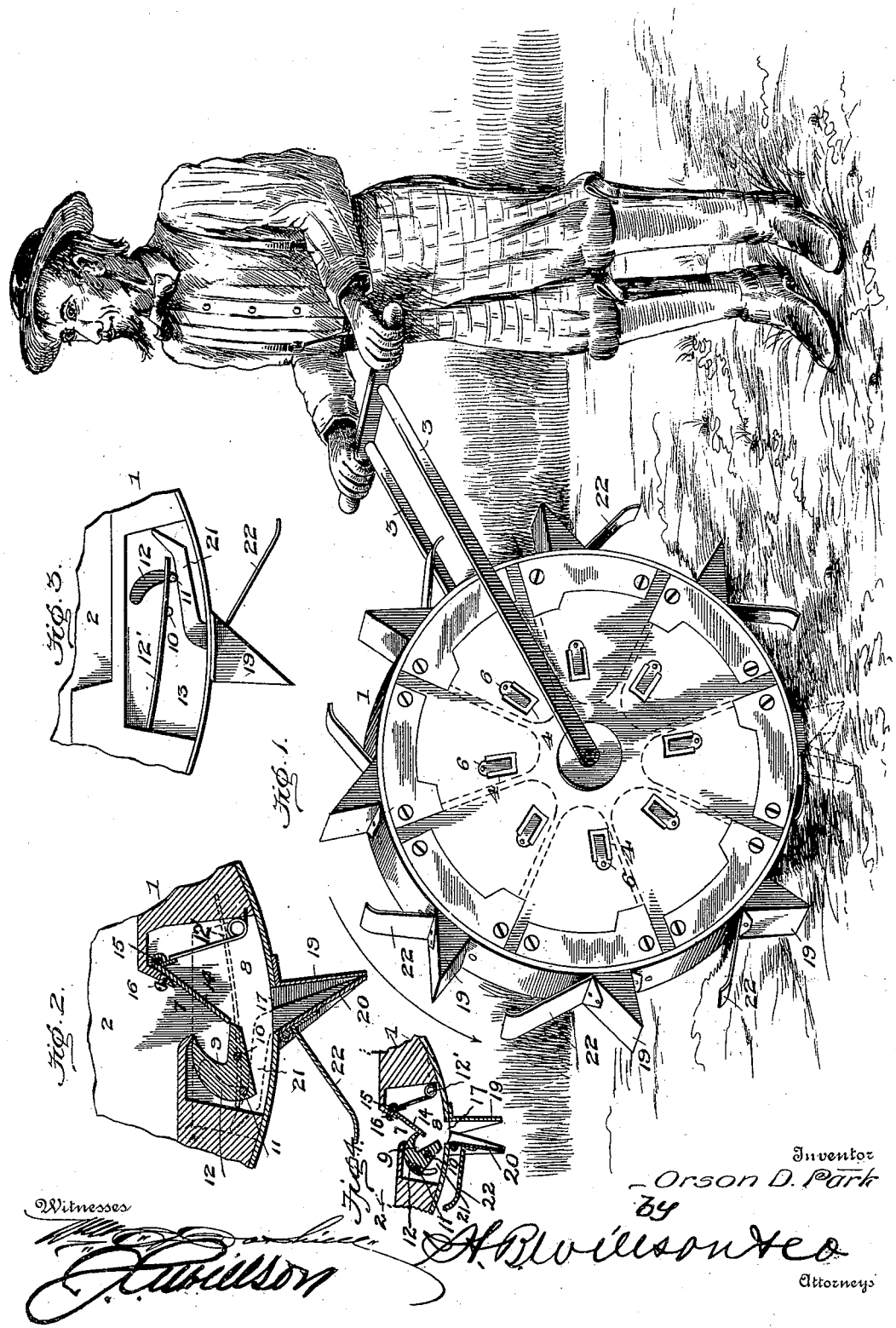
Inventor
Orson D. Park
by
Attorneys
Witnesses

UNITED STATES PATENT OFFICE.

ORSON D. PARK, OF MANTON, MICHIGAN.

SEED-PLANTER.

SPECIFICATION forming part of Letters Patent No. 649,257, dated May 8, 1900.

Application filed February 21, 1900. Serial No. 6,095. (No model.)

*To all whom it may concern:*

Be it known that I, ORSON D. PARK, a citizen of the United States, residing at Manton, in the county of Wexford and State of Michigan, have invented certain new and useful Improvements in Seed-Planters; and I do declare the following to be a full, clear, and exact description of the invention, such as will enable others skilled in the art to which it appertains to make and use the same.

The invention relates to seed-planters, and more particularly to that class of planters capable of being operated by a person and to plant seed in predetermined quantities and at regular intervals.

The object of the invention is to provide a seed-planter of this character which shall be simple of construction, durable in use, and comparatively inexpensive of production, efficient in operation, and by means of which a maximum quantity of seed may be sown to a minimum expenditure of labor and in regular order.

To this end the invention consists in certain features of construction and combination of parts, which will be hereinafter fully described and claimed.

In the accompanying drawings, Figure 1 is a perspective view of my improved seed-planter. Fig. 2 is an enlarged vertical sectional view through one of the seed-compartments of the seed box or hopper. Fig. 3 is a detail side view of a portion of the seedbox, illustrating parts hereinafter described. Fig. 4 is a detail fragmentary view of the seed-bill, showing it in the act of discharging the seed and the valve closed.

In the drawings the same reference characters indicate the same parts of the invention.

1 denotes the cylindrical seed box or hopper, formed with radially-disposed seed-compartments 2 and journaled to handles 3, by means of which the planter is operated by being drawn or pushed along. Each compartment of the seedbox has a filling-aperture 4 in its side covered by a door or valve 6, and each compartment is provided with a discharge-opening 7. This discharge-opening communicates with a recess 8, which is provided with a valve 9, which is pivoted in the ends of the compartments upon a pivot 10 and is provided with a stud 11, which projects through a curved slot 12 in the wall of the recess and is actuated by a spring 12', secured in the wall of a recess 13 on the opposite side of the recess 8.

14 denotes a regulating-plate which is pivoted upon a pin 15 and is held in an inclined position part way across the discharge-opening 7. 16 denotes a screw or equivalent means for engaging said spring-actuated hinged plate to adjust it to the desired quantity of seed to be planted.

The recess 8 is provided with an opening 17, from which leads a seed-bill 19, provided with a hinged cover 20, which has an arm 21 working in the recess 13 and engaged by the spring-actuated stud 11, by which the cover is normally held closed. The cover is also provided with a trip-arm 22, which is adapted in coming in contact with the ground after the bill has been forced into the same to open the cover of the bill, and thereby permit the seed to be discharged in the hole formed by the bill.

From the foregoing description, taken in connection with the accompanying drawings, the construction, operation, and advantages of my improved seed-planter will be readily apparent without requiring an extended explanation.

It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

1. In a seed-planter of the character described, the combination with the seed-compartment provided with a seed-discharge orifice communicating with a recess, a spring-actuated valve located within the recess, an adjustable gage-plate located within the recess and adapted to regulate the quantity of seed to be discharged through the said aperture, a seed-bill leading from the recess, a cover for the seed-bill provided with a trip-arm which, after the seed-bill has been buried in the ground, will be opened by the trip-arm coming in contact with the ground and permit of the discharge of seed through the bill, and a connection between the cover and the valve, whereby when the cover is opened, the valve will close the discharge-opening in the seed-compartment, substantially as and for the purpose set forth.

2. In a seed-planter of the character described, the combination with the seed-compartment provided with a seed-discharge orifice communicating with a recess, a spring-actuated valve located within the recess, a seed-bill leading from the recess, a cover for the seed-bill provided with a trip-arm which, after the seed-bill has been buried in the ground, will be opened by the trip-arm coming in contact with the ground and permit of the discharge of seed through the bill, and a connection between the cover and the valve, whereby when the cover is opened, the valve will close the discharge-opening in the seed-compartment, said connection consisting of a stud projecting from said valve, a spring bearing against said stud, and an arm projecting from said cover and actuated by said stud, substantially as and for the purpose set forth.

In testimony whereof I have hereunto set my hand in presence of two subscribing witnesses.

ORSON D. PARK.

Witnesses:
 GEO. F. WILLIAMS,
 H. M. BILLINGS.